Patented May 29, 1923.

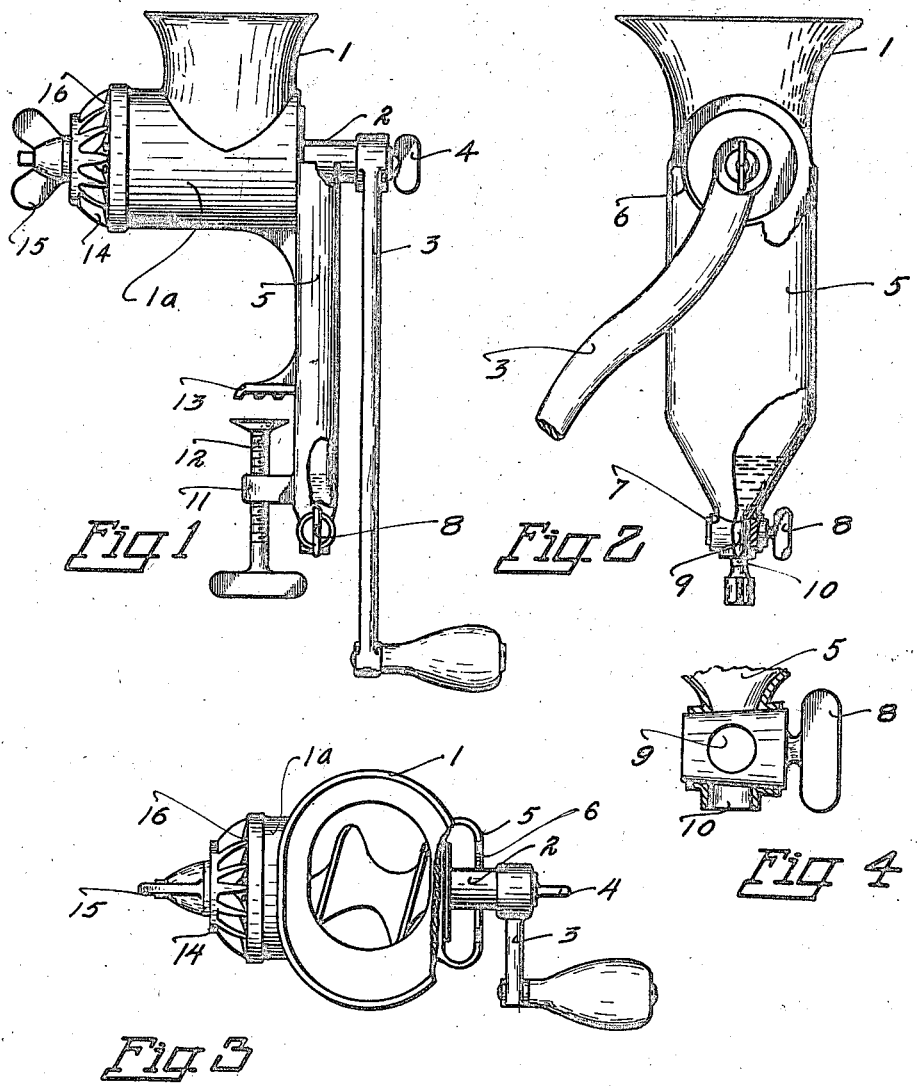

1,456,651

UNITED STATES PATENT OFFICE.

D. MYRTILLE RIEMAN, OF PORTLAND, OREGON.

FOOD-GRINDING MACHINE.

Application filed August 3, 1922. Serial No. 579,531.

*To all whom it may concern:*

Be it known that I, D. MYRTILLE RIEMAN, a citizen of the United States, residing at Portland, in the county of Multnomah and the State of Oregon, have invented a new and useful Improvement for a Food-Grinding Machine, of which the following is a specification.

My improvement relates to the food grinding machines wherein the food is placed within a hopper and is fed, by means of pressure, applied upon the food, to be ground wherein the food is forced, through openings past a rotating cutter which contacts closely with the frame or discharge end of the machine.

The object of my invention is to provide a receptacle or container, which may be a part of the frame of the food grinder, placed at the feeding or crank end, in such manner, as to catch the liquids, or juices that escape, and prevent same from dripping to the floor or upon the table or drain board to which the food grinder is attached. This receptacle has a cock located in its lower end, by the turning of which, the collected juices or liquids may be discharged into a desired container, this receptacle for collecting the escaping juices or liquids is made of such dimension as to readily adapt itself to hand cleansing.

I attain these objects by the mechanism illustrated in the accompanying drawings, in which—

Fig. 1 is a side elevation of the assembled food grinder showing the juice receptacle partially broken away to more clearly illustrate its construction and function. Fig. 2 is an end view of the same with the receptacle also partially broken away also to show the construction of the cock located at the lower end of the receptacle.

Fig. 3 is a plan or top view of the food grinder with the hopper partially broken away to better illustrate the location and method of attaching the juice receptacle to the food grinder of the usual construction. Fig. 4 is a detached view of the cock and valve located at the lower end of the juice or liquid receptacle illustrating its construction and its relation with its seat, within the lower end of the receptacle.

Similar numerals refer to similar parts throughout the several views.

1 is the hopper which is a part of the bowl 1$^a$, of the mechanism, 2 is the shank of the feeding screw for applying the feeding pressure, 3 is the crank for applying the turning movement to the screw and is held in place on the shank by means of thumb screw 4, 5 is the juice or liquid container which is attached and may be made integral with the bowl of the food grinder frame and is relieved at the top as shown at 6 to permit the admission of the pressure screw therethrough, 7 is the stem of the cock, having thumb nut 8 thereon, and having opening 9 through the stem, when in position as shown in Fig. 4 the liquids may be drained from the container by making opening 9 register with the opening 10, when this is accomplished a free passage is permitted of the liquid or juice that has been collected within the receptacle accumulated during the operation of the food grinder. 11 is the projection or boss having a threaded hole therethrough for admission of screw 12, and 13 is the bracket against which the support is clamped for supporting the food grinder when in place by the action of the screw 12. 14 is the rotating cutter held in position by means of thumb nut 15 and by the application of which the cutter is caused to engage with the surface 16.

It will thus be seen from the description that as the food to be ground is fed into the machine or food grinder that a pressure is exerted within the grinder and therefore liquids or juices will be excreted from the machine through the orifices caused by the passage of the member 2 through the frame of the grinder and as these liquids or juices emerge from within the pressure chamber they will be collected by running into the the receptacle provided for that purpose.

Having thus described my invention I wish to make the following claims therefor—

1. The combination in a food grinder of a receptacle frame having a hopper and a bowl for the admission of materials, means for exerting pressure to force the materials through the bowl and means for collecting and discharging at will liquids collected upon the power end of the pressure means all for the purpose as specified and described.

2. The combination in a food grinder of a means for admission of material to be ground into a pressure chamber, means for exerting pressure within the chamber, means for collecting the excretions from the power end of the grinder, means for containing or discharging the collected excreted materials and means for maintaining the food grinder within or upon a desired location, all for the purpose as specified and described.

3. The combination in a food grinder of a horizontal food grinder and perpendicular receptacle for collecting the products of excretion flowing from the pressure chamber of the grinder and means for retaining and discharging at will the excretion products all for the purpose as specified and described.

4. The combination with a food grinder embodying a bowl and a grinding screw, of a liquid receptacle connected to one end of the bowl and depending therefrom, and means for controlling the discharge of liquid from the receptacle.

D. MYRTILLE RIEMAN.